United States Patent
Dyke et al.

(10) Patent No.: US 6,870,836 B1
(45) Date of Patent: Mar. 22, 2005

(54) SYSTEM AND METHOD FOR TRANSFER OF IP DATA IN AN OPTICAL COMMUNICATION NETWORKS

(75) Inventors: Peter Dyke, Saffron Walden (GB); Michael P Dyer, Stansted (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/540,642

(22) Filed: Mar. 31, 2000

(51) Int. Cl.$^7$ .................. H04J 14/08; H04L 12/413
(52) U.S. Cl. .................. 370/355; 370/389; 370/447; 370/461; 370/465; 398/36; 398/99
(58) Field of Search ................ 370/352, 355, 370/389, 395.1, 395.6, 401, 445, 447, 461, 462, 463, 465, 466, 467, 446, 448, 425, 407, 408; 398/25, 36, 43, 46, 58, 74, 98, 99, 115, 63, 64; 709/252

(56) References Cited

U.S. PATENT DOCUMENTS

| | | | | |
|---|---|---|---|---|
| 4,646,361 A | * | 2/1987 | Usui | 398/62 |
| 4,894,819 A | * | 1/1990 | Kondo et al. | 398/99 |
| 5,390,181 A | * | 2/1995 | Campbell et al. | 370/444 |
| 5,930,018 A | * | 7/1999 | Effenberger | 398/161 |
| 6,317,234 B1 | * | 11/2001 | Quayle | 398/9 |
| 6,470,032 B2 | * | 10/2002 | Dudziak et al. | 370/503 |
| 6,493,335 B1 | * | 12/2002 | Darcie et al. | 370/344 |
| 2002/0032001 A1 | * | 3/2002 | Fischer et al. | 455/3.01 |

* cited by examiner

Primary Examiner—Alpus H. Hsu
(74) Attorney, Agent, or Firm—Barnes & Thornburg LLP

(57) ABSTRACT

A system (100) to enable the transfer of Internet protocol (IP) format data (12, 14) over a point-to-multipoint passive optical network (PON, 16) is illustrated in FIG. 2. An exchange (102) is connected to a plurality of outstations (104–108) via an optical communication resource (24, 26–38) including a passive optical splitter (22) providing isolation to individual outstations. Media access control of the plurality of outstations is administered by the exchange (102), with collision detection logic (112) in the exchange determining collision (158) of Internet protocol (IP) encoded data communicated thereto through the PON (16). The IP encoded data realises a transport mechanism through the PON. Each of the plurality of outstations (104–108) and the exchange (102) is adapted to pass data in an IP format to and from the optical communication resource such that IP encoded data is transported, in use, directly between the outstation and the exchange.

16 Claims, 3 Drawing Sheets

SYSTEM AND METHOD FOR TRANSFER OF IP DATA IN AN OPTICAL COMMUNICATION NETWORKS

BACKGROUND TO THE INVENTION

This invention relates, in general, to a system and method for transporting data, video and voice traffic between an exchange and a user within an optical communication network and is particularly, but not exclusively, applicable to the transfer of internet protocol (IP) traffic (in its native form) over a passive optical network (PON).

SUMMARY OF THE PRIOR ART

Modern telecommunications systems are increasingly carrying data in an optical transfer domain between exchanges and end-users via optical fibre, thereby conveying data in a fast, reliable and accurate way. A passive optical network (PON) refers to a system in which the transported optical signal is not converted or amplified in any significant way. PONs consequently provide a simple and cheap method of transferring data between an exchange and a variety of end-users, including domestic dwellings and small businesses since little can go wrong within passive elements and active devices otherwise avoided thereby obviating the requirements for active management and the provision of power.

The optimisation of communication networks is essential for cost effective operation by network providers.

It will be appreciated that current PONs generally use an asynchronous transfer mode (ATM) as the transport protocol. The ATM protocol is a packet-based system in which the transfer of data is regimented into cells, typically containing fifty-three bytes. Each conventional ATM cell is structured to support forty-eight bytes of user data (or "payload") and five header bytes of control overhead. In fact, the ATM protocol has been designed to handle all types of traffic, such as voice, video and computer data, and this has led to the development of a variety of ATM adaptations optimised to specific data requirements. ATM is considered to be a secure, robust and manageable protocol, and has therefore been widely deployed as a broadband background to enhanced telecommunication systems. However, with any packet-based system, under-utilisation of the payload bytes is always a possibility. Clearly, under-utilisation leads to inefficiencies within system operation and, specifically, an associated waste (arising from an effective requirement of pre-allocation) of, ultimately, limited bandwidth (even with the use of dedicated ATM adaptation layer (AAL) protocols). In any event, it is known to use ATM as the transport protocol over a PON (defined in FSAN technical standard G.983 and generally termed "APON").

An APON generally couples an exchange, at a connection's 'head-end', to a plurality of outstation at the connection's 'tail-end'. In the context of APONs and similar networks, an outstation is usually a user terminal (termed an outstation or ONU) having a man-machine interface for data input and data recovery/display, although it can also apply to a distribution point, such as a kerb-side unit or cabinet. Several customers/subscribers may be coupled to a single distribution point via, for example, copper drops (i.e. twisted pairs) or coax, whereby these several customers share a common optical resource to the exchange (or servicing base station/optical line termination (OLT) equipment). In a downlink, the exchange is therefore capable of operating on either a point-to-point or point-to-multipoint (broadcast basis), whereas an uplink supports point-to-point connection only. The sharing of the optical resource does, however, require certain control mechanisms for the ONUs and their upstream transmission which are, in generality, addressed by using marshalling (i.e. ranging) some form of time division multiple access technique. It is therefore necessary for a large-scale integrated (LSI) chip to be located in each outstation, which LSI includes a processing engine that manages data control data and bandwidth allocation as well as modulation, protocol conversion/adaptation and error correction). Consequently, an APON LSI component is both complex and expensive. Protocol conversion (i.e. ATM adaptation) from, say, an IP to an ATM domain is processor intensive, time consuming and also expensive.

In relation to an APON, the isolation provided by the passive splitter curtails an ability of an ONU to identify and resolve data uplink collisions. Consequently, a structured approach to bandwidth allocation is employed in which an ONU will request the provisioning of bandwidth through a control channel accessible on a TDMA basis from the ONUs. From a downlink perspective, specific ONU addressing and TDM partitioning of channel resources obviates data collision. APONs, as will now be appreciated, must support ATM adaptation (both at the base station/exchange and each ONU.

The transmission of IP via an Ethernet bus, whether over copper pairs, coax or optical fibre, is well-known in relation to either point-to-point or multipoint-to-multipoint connections in computing and local area network environments only. Such Ethernet systems have various topologies and are described, for example, in IEEE802.3. For example, a 10 Mbit/s coaxial Ethernet bus is a passive cable having a reach of, typically, several hundred meters. The original coaxial Ethernet bus is able to serve up to about one hundred outstations along its length, with each outstation containing a media access control unit (referred to by the interchangeable abbreviations MAU and MAC). Essentially, each outstation is served by a serially coupled drop from a central bus. More specifically, the serial interconnection plan curtails communication at any break in the central bus and so network access may be restricted in a partially operational system.

As an alternative Ethernet structure, a more operationally insensitive system is acquired through deployment of an architecture in which a star topology supports several outstations connected to a central 'hub'.

In any event, within such Ethernet systems, every outstation coupled to a common bus potentially has access to the data addressed to or emanating from every other interconnected outstation, and so the network is somewhat unsecure in the sense that an unscrupulous user could illicitly look to recover/monitor data traffic.

As will be understood, detection of data collision causes the transmitting units to back-off transmissions for a pseudo-randomly generated period of time, whereafter retransmission is attempted.

Downlink transmissions are generally not subject to collision detection issues since they can be actively managed from an exchange (or the like), such as by packet interleaving, while the specific nature imposed through the use of an ONU address allows broadcast transmission or specific routing within the communication system.

The skilled artisan will also be aware of the development of IP as a data transfer mechanism in computer and local area network (LAN) environments, principally arising from the increasing use of the internet. Optical networks are therefore now supporting IP to broadband ATM conversion, and this imposes a cost implication (both financial and operational performance-related) principally on subscriber units, such as outstations.

The 10 Base-FP fibre passive (IEEE 802.3) system does, in essence, provide for an any-to-any mapping of transceivers, albeit that this is achieved at the expense of interconnection complexity. Specifically, this system employs an optical splitter couples the ONUs together with optical fibres. The optical splitter, as will be appreciated, provides a dispersion/concentration function in the optical domain, with a multiplicity of ONUs gaining access to the optical fibre resource (and the splitter) through dedicated pairs of fibres. More specifically, the any-to-any function is supported by virtue of the optical splitter being symmetric and containing double the number of splitter ports that would be required if bidirectional transmission could be achieved. Essentially, each transmission point within the network is interconnected to a downlink side of the optical splitter, with each reception point (in the exchange and the multiplicity of ONUs) responsive (in a similar fashion) to an uplink side of the optical splitter. The requirement for a dual fibre system with twice the number of splitter ports should now be apparent, with the dual fibre increasing deployment costs but providing the ONUs with an ability to monitor channel access to avoid data collisions. However, each ONU must therefore include an LSI having augmented functionality, i.e. a dedicated collision detection/arbitration mechanism. This system therefore suffers from a decreased level of security compared to APON since all uplink transmissions may be seen by all ONUs, although this can be overcome by providing encryption either at each ONU. In any event, there is still a possibility that uplink data collisions can occur, since instantaneously commenced transmissions from multiple ONUs will not be detected by any collision detection algorithm.

Recently, the Ethernet standard IEEE 802.3 has been extended to include optical 'Gigabit Ethernet'. This system is based on point to point optical transmission links between active nodes. Multiple stations are interconnected via individual point to point links to a repeater unit at the logical hub of the network. The repeater performs optical to electrical conversion of optical input signals from individual stations and broadcasts signals received on any one input to all other outputs via electrical to optical converters, thereby achieving any-to-any connectivity. Collisions are detected at the repeater by identifying simultaneous optical activity on more than one input. In response the repeater broadcasts a known signal on all outputs to inform any transmitting station that a collision has occurred.

It will be appreciated that this system requires active electronic components in the repeater node and therefore does not fulfil the telecommunications operator's requirement for only passive elements in external networks.

In an Ethernet network, it is normal for stations to check for current activity on the medium before attempting to transmit. This greatly reduces the likelihood of collisions, especially when the medium is relatively heavily loaded. It will be appreciated that the any-to-any connectivity inherent in Ethernet networks allows this check to be made autonomously at any station in a straightforward manner.

In a network where connectivity is from outstations to a centrally located optical line termination (OLT) but not between outstations an alternative mechanism is needed to accomplish this.

It will be appreciated that the Ethernet standard is intended to provide any-to-any connectivity amongst the terminals connected to the system. From a telecommunications operator's perspective, it is normally desirable that access networks intended for linking individual customers to a central facility should provide connectivity between any customer and the central facility, but should not allow traffic to pass directly from customer to customer since this may inhibit the operator's ability to bill the customer for the service, in addition to privacy implications discussed above.

Wave division multiplexing (WDM) can also be supported by a 10 Base-FP fibre passive system, provided that the requisite WDM splitters are located within the respective paths.

SUMMARY OF THE INVENTION

According to a first aspect of the present invention there is provided a communication system comprising optical line termination (OLT) equipment coupled to a plurality of outstations through an optical communication resource, the optical communication resource including an optical splitter providing a point-to-multipoint concentration/distribution function between the OLT equipment and the plurality of outstations, wherein: the OLT equipment comprises collision detection logic to support media access control of the plurality of outstations to the OLT equipment via the optical splitter and over the optical communication resource, the collision detection logic responsive to packet-switched encoded data communicated thereto through the optical communication resource, the packet-switched encoded data realising a transport mechanism through the optical communication resource; and wherein each of the plurality of outstations is adapted to pass data in a packet-switched format to and from the optical communication resource such that packet-switched encoded data is transported, in use, directly between the outstation and the OLT equipment.

The collision detection logic preferably includes at least one of: means for monitoring a root-mean-square (rms) level of a signal communicated across the optical communication resource on one of an instantaneous and time-averaged basis; means for monitoring a peak-to-peak level of a signal communicated across the optical communication resource on one of an instantaneous and time-averaged basis; means for identifying invalid recovered data bits; and means for contrasting received signal signatures to identify irregularities indicative of data collision.

The plurality of outstations each include a signal processor arranged, in use, to code incident IP packets within a predetermined line code.

In a second aspect of the present invention there is provided optical line termination (OLT) equipment responsive, in use, to a modulated optical carrier supporting a packet-switched protocol coded into a predetermined line code format, the modulated optical carrier emanating from at least one outstation, the optical line termination equipment comprising: collision detection logic to support media access control of a plurality of outstations to the OLT equipment, the collision detection logic responsive to packet-switched encoded data communicated thereto.

The optical line termination (OLT) equipment, in one embodiment, further comprises: means for coding IP packets into a predetermined line code format; and means for modulating the predetermined line code onto an optical carrier; wherein IP encoded data realises a transport mechanism through an optical communication resource connectable, in use, to the OLT equipment; and wherein the OLT equipment is adapted to pass data in an IP format to and from the optical communication resource such that IP encoded data is transported, in use, directly between the OLT equipment and an outstation.

In another embodiment, the optical line termination (OLT) equipment includes means for notifying outstations of a data collision event, said means for notifying responsive to the collision detection logic.

In a third aspect of the present invention there is provided a method of operating an outstation connectable, in use, to a communication exchange through an optical communication resource, the method comprising: receiving data packetised in an internet protocol (IP) format; coding the IP formatted data into a line code; modulating the line code onto an optical carrier; and applying a resultant modulated optical carrier to the optical communication resource, such that the IP formatted data, in use, is utilised to support media access control of the outstation and wherein: the IP formatted data realises a transport mechanism through the optical communication resource; and the IP formatted data is passed to and from the optical communication resource such that IP formatted data is transported, in use, directly between the outstation and the communication exchange.

In a further aspect of the present invention there is provided an outstation connectable, in use, to a communication exchange through an optical communication resource, the outstation comprising: means for receiving data packetised into a packet-switched protocol format; means for coding the packet-switched formatted data into a line code; means for modulating the line code onto an optical carrier; and means for applying a resultant modulated optical carrier to the optical communication resource, such that the packet-switched formatted data, in use, is utilised to support media access control of the outstation and wherein: the packet-switched formatted data realises a transport mechanism through the optical communication resource; and the packet-switched formatted data is passed to and from the optical communication resource such that packet-switched formatted data is transported, in use, directly between the outstation and the communication exchange.

In another aspect of the present invention there is provided a method of operating base station equipment for a communication exchange, the method comprising: receiving an optical carrier modulated with a line code supporting packet-switched protocol packaged data; detecting uplink collisions; and administering media access control to a plurality of outstations connectable to the communication exchange through an optical communication resource, wherein media access control is regulated by the base station according to uplink collision of packet-switched encoded data received in modulated optical carriers.

The method may further comprise: coding IP packets into a line code format; and modulating the predetermined line code onto an optical carrier; wherein IP encoded data realises a transport mechanism through the optical communication resource; and wherein the base station is adapted to pass data in an IP format to and from the optical communication resource such that IP encoded data is transported, in use, directly between the base station and an outstation.

In yet another aspect of the present invention there is provided a method of communicating information between outstations and optical line termination equipment via an optical fibre, the method comprising: receiving data packetised in a packet-switched format; coding the packet-switched formatted data into a line code; modulating the line code onto an optical carrier; applying a resultant modulated optical carrier to the optical communication resource, wherein the packet-switched formatted data realises a transport mechanism through the optical fibre and the packet-switched formatted data is passed to and from the optical communication resource such that packet-switched formatted data is transported, in use, directly between the outstations and the optical line termination equipment; detecting, at the optical line termination equipment, uplink collisions; and administering media access control of outstations according to the detecting of uplink collision of packet-switched encoded data received in modulated optical carriers.

In still yet another aspect of the present invention there is provided a computer program product for controlling exchange equipment to administer media access control of a plurality of optical outstations coupled to the exchange equipment through an optical fibre, the computer program product comprising: code that directs the exchange equipment to receive an optical carrier modulated with a line code supporting packet-switched protocol packaged data; code that directs the exchange equipment to detect uplink collisions; and code that directs the exchange equipment to administer media access control of the plurality of optical outstations based on detection of uplink collision of packet-switched protocol encoded data received in modulated optical carriers; wherein the codes reside in a computer readable medium.

The computer program product may include: code that directs the exchange equipment to code IP packets into a line code format; and code that directs the exchange equipment to modulate the line code onto an optical carrier, wherein IP encoded data realises a transport mechanism through the optical fibre; code that directs the exchange equipment to pass data in an IP format to and from the optical fibre such that IP encoded data is transported, in use, directly between the exchange equipment and at least one outstation.

The packet-switched protocol is preferably Internet Protocol (IP).

Advantageously, the present invention provides a point-to-multipoint optical transmission system which enables the transfer of IP traffic in its native format over a PON. The IP PON ensures secure, independent connections from each user to the exchange and robust transport over the fibre network. A simple IP transport protocol is used which removes the need for complex and expensive APON LSI chips in each outstation. The present invention therefore, beneficially, reduces the complexity of outstations by removing the burdens of the high cost and complexity associated with locating an APON LSI or collision detection unit at each outstation.

BRIEF DESCRIPTION OF THE DRAWINGS

An exemplary embodiment of the present invention will now be described with reference to the accompanying drawings, in which.

DETAILED DESCRIPTION OF A PREFERRED EMBODIMENT

Figure 1:
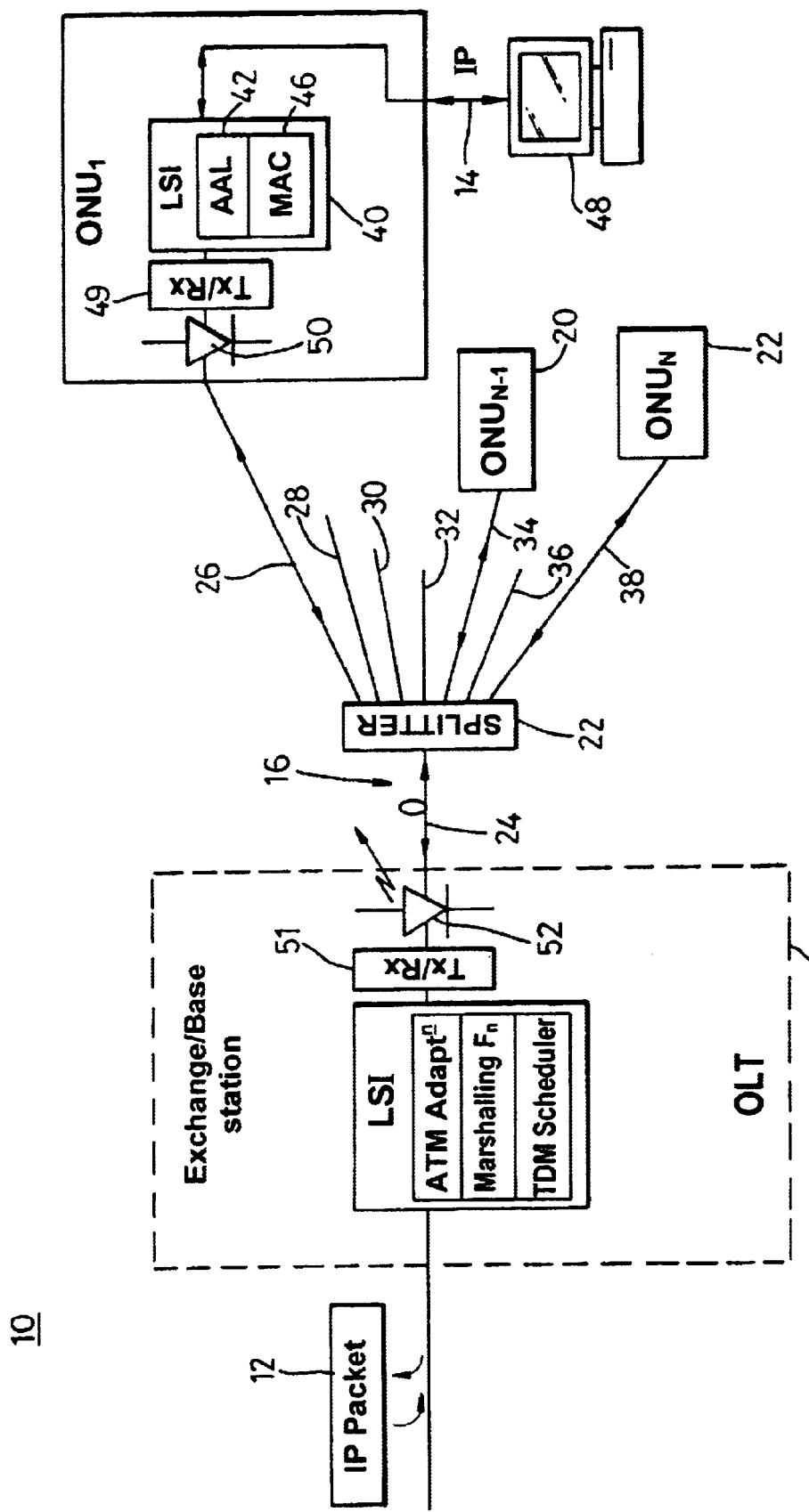
FIG. 1 is a block diagram of a prior art communication network supporting an IP over ATM transfer mechanism in a passive optical network (PON)

FIG. 1 illustrates a prior art duplex optical communication network 10 in which data 12–14 is transferred across a PON 16 using ATM as the transport protocol. In such APONs, outstations 1822 (of which only three are shown for clarity reasons) may only transmit data when specifically allowed to do so by instructions from a base station or exchange, generally termed "optical line termination equipment" (OLT) 20. The OLT 20, located at the 'headend' of the network 10, is connected to a passive optical splitter 22 via an optical fibre 24. A passive splitter 22 is used to distribute (in the downlink) and consolidate (in the uplink) signals to and from the OLT to and from several ONUs. The passive splitter therefore includes a single fibre 24 interface and a multiple fibre 26–38 interface, i.e. point-to-multipoint connectivity. Each of the multiplicity of outgoing fibres 26–38 terminates at one of the outstations, which outstations each contain an LSI chip 40 and to other circuitry (appreciated by the skilled addressee).

The LSI chip 40 has signal processing capabilities, namely ATM adaptation 42 and media access control 46 algorithms. Since the ONU is able to receive and transmit data, the ONU further includes appropriate receiver and transmitter circuitry 49.

Each outstation is coupled to at least one user, such as a computer 48 in a domestic dwelling or small business that provides IP thereto through an interface. Each outstation 18–22 further includes TX/RX modulation circuitry 49 and optical to electrical converters 50, responsive to an incident optical fibre (from the PON 16) and the LSI. The optical to electrical converter 50 may take a number of forms, as will be readily appreciated, although its simplistic manifestation is that of a laser and PIN diode combination.

In a similar structural configuration to the ONU, the OLT 20 also includes an LSI having complementary functionality to that of the LSI 40 within each ONU. The OLT also contains TX/RX modulation circuitry 51 and optical to electrical converters 52 coupled to the optical fibre 24 and responsive to the LSI. Specifically, it contains ATM adaptation functionality for the network, a TDM scheduler and a marshalling function for controlling each ONU.

Transfer of data via this background art optical communication network 10 occurs on a time division multiplexing (TDM) downstream basis and a time division multiple access (TDMA) upstream basis, as described. An addressed outstation will receive a specific data packet determined by the position of the ATM cell within a repeating frame structure, and will transmit ATM data upstream when permitted to do so by the OLT.

Figure 2:
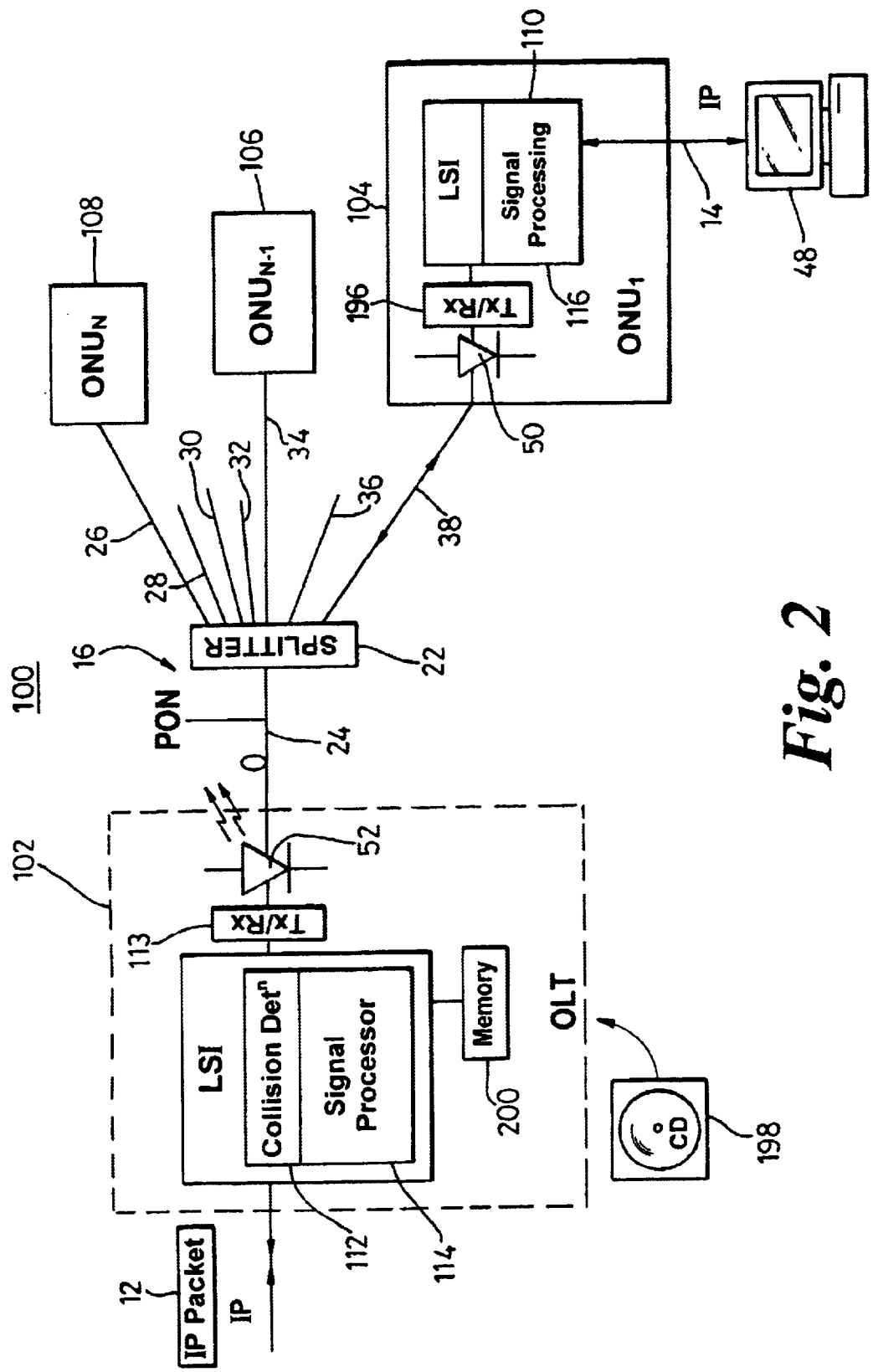
FIG. 2 is a block diagram of a communication system according to a preferred embodiment of the preferred present invention.

Turning now to FIG. 2, there is shown a block diagram of a communication system 100 according to a preferred embodiment of the preferred present invention. OLT equipment 102 is connected to a passive optical splitter 22 via an optical fibre 24. The passive splitter 22 is used to distribute (in the downlink) and consolidate (in the uplink) signals to and from the OLT to and from several ONUs. The passive splitter therefore includes a single fibre 24 interface and a multiple fibre 26–38 interface, i.e. point-to-multipoint connectivity. Each of the multiplicity of fibres 26–38 terminates at one of the ONUs 104–108, which ONUs each contain an LSI chip 110 and other circuitry (readily appreciated by the skilled addressee).

In the ONU the LSI chip 110 has general signal processing capabilities (supported by a signal processor 116), but no ATM adaptation, no collision detection and no media access control algorithms. Since the ONU receives and transmits data, the ONU further includes appropriate receiver and transmitter circuitry 196.

Each outstation is coupled to at least one user, such as a computer 48 in a domestic dwelling or small business that provides IP 14 thereto through an interface. Each outstation 104–108 further includes optical to electrical converters 50, responsive to an incident optical fibre (from the PON 16) and TX/RX modulation circuitry 196 that is coupled to the LSI. The optical to electrical converter 50 may take a number of forms, as will be readily appreciated, although its simplistic manifestation is that of a laser and PIN diode combination.

In a similar structural configuration to the ONUs 104–108, the OLT 102 also includes an LSI (although its functionality is augmented relative to the ONUs through the inclusion of a collision detection algorithm 112). The OLT also contains an optical to electrical converter 52 responsive to the optical fibre 24 and coupled to the LSI (and through TX/RX modulation circuitry 113).

In essence, the preferred embodiment of the present invention contemplates the production of an IP PON in which the OLT equipment comprises collision detection logic to support media access control of the plurality of outstations to the OLT equipment via the optical splitter 22 and over the optical communication resource 24. Moreover, the collision detection logic 112 is responsive to uplink internet protocol (IP) encoded data communicated thereto through the optical communication resource (i.e. the combination of the common pipe 24 and the individual optical drops). The IP encoded data therefore realises/supports a bidirectional transport mechanism through the optical communication resource, with each of the plurality of outstations adapted to pass data in an IP format to and from the optical communication resource such that IP encoded data is transported directly between the outstation and the OLT equipment. There is no interconnection of ONUs, and so collision detection becomes a centralised (OLT) function, thereby simplifying component complexity and reducing ONU cost).

The collision detection algorithm 112 within the OLT 102 may take a number of alternate or complementary forms. For example, a signal processor 114 (running the collision detection algorithm 112) within OLT could monitor the root-mean-square (rms) or peak-to-peak voltage levels of the received optical or electrical signals to imply data collision identified by an instantaneous or an averaged increase in these voltages above a nominally selected operating level. Alternatively, the OLT equipment 102 at the network headend may look to identify invalid recovered data bits from the IP light train to imply collision, e.g. arising in incorrect parity check bits and non-valid cyclic redundancy (CRC) bits. A further collision detection mechanism may look to a comparison of a received signal 'signature' with previously received signals to reveal an irregularity indicative of data collision. These and other methods of data collision will be readily appreciated by the skilled addressee.

In other words, the architecture of the preferred embodiment of the present invention enables a point-to-multipoint optical transmission system to carry telecommunications signals over a PON in IP format without the necessity for IP to ATM adaptation, or the ATM transport protocol over the PON or its associated marshalling function. Advantage is obtained in the system of the preferred embodiment since it is only necessary to provide a single collision detection function with the OLT equipment 102, and so a considerable reduction in system complexity in both the OLT and ONU costs are obtained.

The present invention also benefits over 10 Base-FP fibre passive configurations by the fact that isolation provided by the splitter ensures each ONU 104–108 has a direct connection only to the head-end of the network which is not routed or otherwise communicated via non-addressed/unrelated ONUS. The present invention, therefore, ensures optimum ONU security and a simplified interconnection topography.

The signal processor 114 of the OLT equipment 102 also operates to ensure that up-link IP packets from multiple ONUs are disallowed/discouraged through transmission of a broadcast signal on an optical control channel. Of course, with the use of collision detection and a control channel, then OLT equipment could employ time division multiplexing of IP packets, if desired and if necessary.

Clearly, within the present invention, data transfer requests may originate either incident to or within the exchange (i.e. the OLT equipment 102) or from user equipment. As such, in addition to IP packet data (i.e. traffic) transfer in a downstream direction, there may also be dedicated control data transmitted from the OLT equipment 102 to the ONUs 104–108, which control data may include collision or network management information. Such control information, typically supported on a dedicated control channel, may comprise error checking results or specific or broadcast instructions to temporarily halt (i.e. back-off) up-link IP transmissions in the face of detected data collision. Consequently, any or a selective outstation contributing to system noise may be instructed to re-transmit after a pseudo-random or predetermined delay period, with a signal processor (116 of FIG. 2) within the ONU 104–108 having a facility to generate a pseudo-random or predetermined delay in such circumstances. It will be apparent to one skilled in the art that several methods may be employed to communicate control information between the OLT 102 and ONUs 104–108, including use of a low-level analogue signal, the provisioning of a dedicated carrier, or a suitable modulation technique that encodes the control information onto the traffic carrier, or by the OLT creating its own control signals in IP format for transmitting downstream to the ONUs in addition to normal telecommunications traffic.

Preferably, the mechanism for signalling control information should be fast enough to allow ONUs to be informed of a collision before transmission of the colliding packets has finished. In a duplex system, where traffic is passed concurrently both upstream and downstream, transmission of control information should preferably not be required to wait for transmission of a downstream IP packet to complete.

Preferably, the control information should also include signalling to inform ONUs when the optical medium is in use by another ONU. To optimise network efficiency, this information should be transmitted at the earliest opportunity once activity is detected.

As regards processing of incident IP packets, signal processors within the OLT 102 and ONUs are arranged to code the IP packets into arbitrarily selected line codes that are subsequently modulated onto an optical carrier. The line code is invention independent and may take a number of forms readily appreciated by the skilled addressee, e.g. binary, ternary, quadrature amplitude modulation (QAM) and the like. However, the TX/RX modulation circuitry in the IP PON of the present invention may differ from that employed in the APON due to the more bursty nature of IP traffic.

Figure 3:
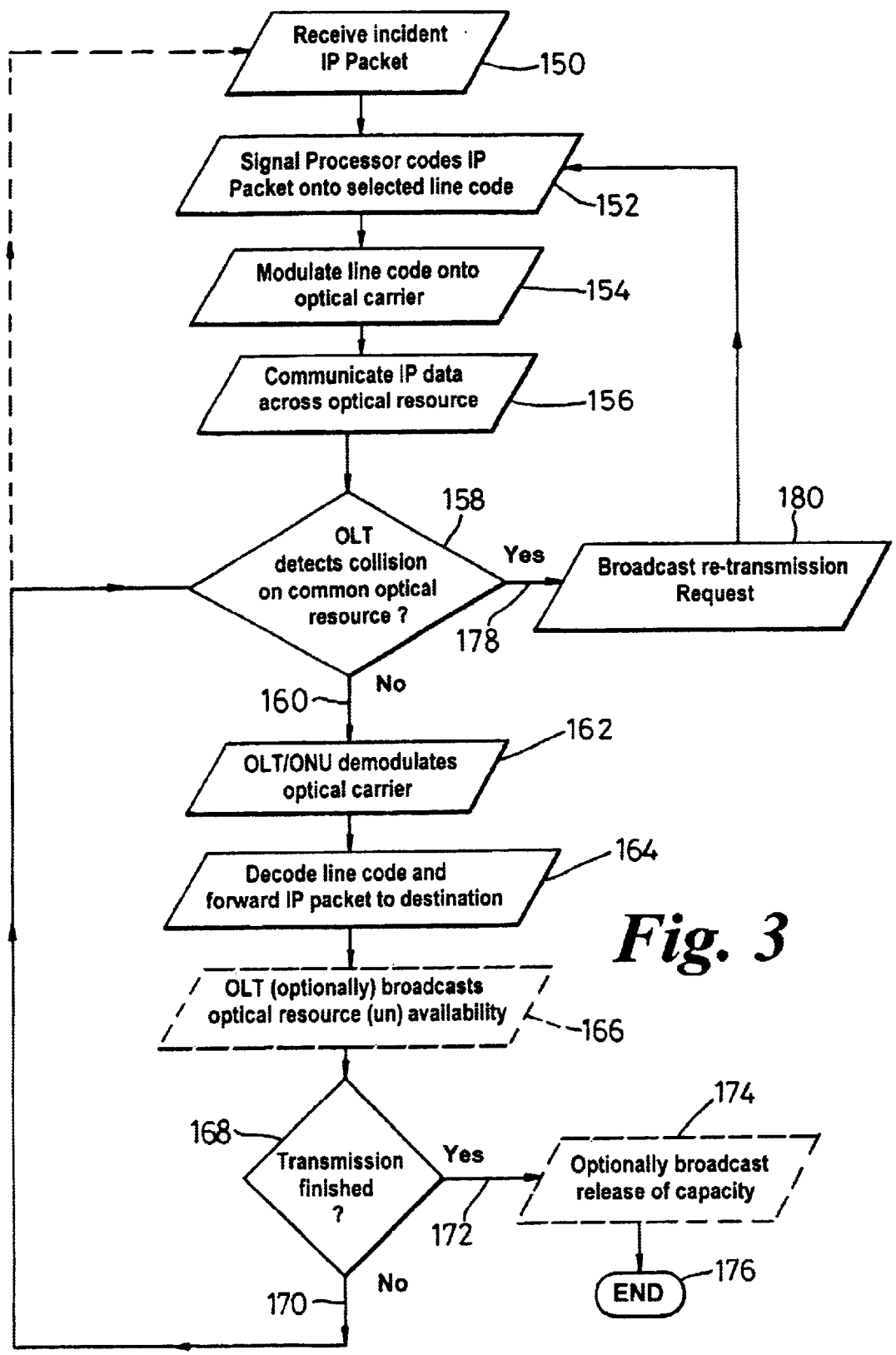
FIG. 3 is a flow diagram illustrating a preferred operating method for the communication network of FIG. 2.

FIG. 3 is a flow diagram illustrating a preferred operating method for the communication network of FIG. 2. Although the process concentrates on the uplink (in view of the collision detection issues).

The process begins with the reception 150 (or internal generation) of packetised IP data. The signal processor codes 152 the IP packet onto a selected line code used for transmissions (such as performed by TX/RX modulation circuitry 196 of FIG. 2) and this information-bearing line code modulates 154 the optical carrier. A resultant modulated signal may then be communicated 156 across the optical resource. The process steps to this point are generally consistent with both the uplink and the downlink.

At a head-end, the OLT equipment 102 determines 158 whether there appears to be a data collision (using the collision detection algorithm(s)). In the negative 160, the OLT/ONU demodulates the optical carrier 162 and then decodes 164 the line code to recover the IP packet for forwarding/routing to an addressed destination. The step of collision detection (i.e. decision block 158) may, of course, occur elsewhere within the flow since the collision detection algorithm may be operationally responsive to encoded data bits.

Based on optical channel loading, the OLT may (optionally) broadcast 166 optical resource (un)availability such that the ONUs can optimise uplink data transmissions to avoid unnecessary collisions. In other words, it is preferable that the OLT also includes means for informing outstations when the optical medium is in use by another outstation. This allows outstations to check before starting transmission that the medium is not already in use and greatly increases the efficiency of the network.

At some point within the process, an assessment 168 may be made as to whether a particular call has finished, and in the negative flow essentially returns to decision block 158 and step 150. If the call has terminated 172, then the OLT may broadcast 174 release of channel capacity (whether this is through use of a dedicated control channel or otherwise). The process then ends 176.

Should two outstations (ONUs) initiate simultaneous transmission (affirmative path 178 from decision block 158), a resultant data collision will be detected at the OLT 102 by one of the aforementioned contention mechanisms. The OLT 102 subsequently causes either selective addressed or broadcast transmission 180 of a re-transmission instruction to the ONUs 104–108, with the ONUs responding with re-transmission (effectively step 152 onwards) of the IP packet after a pseudo-random or predetermined delay.

Following collision detection, each outstation conventionally backs off and retransmits the IP packet after a pseudo-random or predetermined delay. In the interests of providing a reduced delay for delay-sensitive traffic, this predetermined delay can be made shorter for traffic that is high priority, and longer for lower priority traffic, to ensure that the high priority traffic has preference.

In summary, according to an underlying inventive concept, a system of the preferred embodiment operates to transfer IP data via a PON, wherein only a single collision detection unit is required at the network head-end, i.e. the OLT equipment 102.

The present invention provides connectivity between each outstation and the base station only.

It will be appreciated that the above description has been given by way of example only and that modification in detail may be made within the scope of the invention. For example, while the preferred embodiment discusses an IP PON that both uses collision detection (in the exchange) as its protocol for media access and uses IP as its end-to-end connection protocol, it is envisaged that the IP PON could be substituted for an alternative architecture supporting a different transfer protocol mechanisms, e.g. code division multiple access (CDMA), Coding of IP packets into line code (as well as control of the optical modulation process) could be administered by software/firmware and so the necessary code could be provided to the OLT/ONU on a computer program product, such as a CD ROM, or via a suitable data carrier. The computer program product of the like (198 of FIG. 2) is therefore potentially loadable into a memory 200 associated with the signal processor 114, 116 (of FIG. 2).

The term optical line termination equipment should be reviewed broadly and should be interpreted to mean headend equipment, such as exchanges, base station and the like.

It is contemplated that the present invention may be extended to support other packet-switched protocols other than IP, with such other packet-switched protocols being readily appreciated by the skilled addressee.

What is claimed is:

1. A communication system comprising optical line termination (OTL) equipment coupled to a plurality of outstations through an optical communication resource, the optical communication resource including an optical splitter providing a point-to-multipoint concentration/distribution function between the OLT equipment and the plurality of outstations, wherein:

the OLT equipment comprises collision detection logic to support media access control of the plurality of outstations to the OLT equipment via the optical splitter and over the optical communication resource, the collision detection logic responsive to packet-switched encoded data communicated thereto through the optical communication resource, the packet-switched encoded data realising a transport mechanism through the optical communication resource; and wherein each of the plurality of outstations is adapted to pass data in a packet-switched format to and from the optical communication resource such that packet-switched encoded data is transported, in use, directly between the outstation and the OLT equipment.

2. The communication system of claim 1, wherein the collision detection logic includes at least one of:

means for monitoring a root-mean-square (rms) level of a signal communicated across the optical communication resource on one of an instantaneous and time-averaged basis;

means for monitoring a peak-outpeak level of a signal communicated across the optical communication resource on one of an instantaneous and time-averaged basis;

means for identifying invalid recovered data bits; and means for contrasting received signal signatures to identify irregularities indicative of data collision.

3. The communication system of claim 1, wherein the packet-switched encoded data is Internet Protocol (IP).

4. The communication system of claim 3, wherein the plurality of outstations each include a signal processor arranged, in use, to code incident IP packets within a predetermined line code.

5. Optical line termination (OLT) equipment responsive, in use, to a modulated optical carrier supporting a packet-switched protocol coded into a predetermined line code format, the modulated optical carrier emanating from at least one outstation, the optical line termination equipment comprising:

collision detection logic to support media access control of a plurality of outstations to the OLT equipment, the collision detection logic responsive to packet-switched encoded data communicated thereto;

6. Optical line termination (OLT) equipment according to claim 5, further comprising:

means for coding packet-switched protocol packets into a predetermined line code format; and means for modulating the predetermined line code onto an optical carrier;

wherein packet-switched coded data realises a transport mechanism through an optical communication resource connectable, in use, to the OLT equipment; and wherein the OLT equipment is adapted to pass data in a packet-switched format to and from the optical communication resource such that packet-switched encoded data is transported, in use, directly between the OLT equipment and an outstation.

7. Optical line termination (OLT) equipment according to claim 5, further comprising means for notifying outstations of a data collision event, said means for notifying responsive to the collision detection logic.

8. Optical line termination (OLT) equipment according to claim 5, wherein the packet-switched protocol is Internet Protocol (IP).

9. A method of operating base station equipment for a communication exchange, the method comprising:

receiving an optical carrier modulated with a line code supporting packet-switched protocol packaged data;

detecting uplink collisions; and administered media access control to a plurality of outstations connectable to the communication exchange through an optical communication resource, wherein media access control is regulated by the base station according to uplink collision of packet-switched encoded data received in modulated optical carriers.

10. The method of operating the base station equipment of claim 9, further comprising:

coding packet-switched packets into a line code format; and modulating the predetermined code onto an optical carrier;

wherein packet-switched encoded data realises a transport mechanism through the optical communication resource; and wherein the base station is adapted to pass data in an packet-switched format to and from the optical communication resource such that packet-switched encoded data is transported, in use, directly between the base station and an outstation.

11. The method of operating the base station equipment of claim 9, wherein the packet-switched protocol is Internet Protocol (IP).

12. A method of communicating information between outstations and optical line termination equipment via an optical fibre, the method comprising:

receiving data packetised in a packet-switched format;

coding the packet-switched formatted data into a line code;

modulating the line code onto an optical carrier;

applying a resultant modulated optical carrier to the optical communication resource, wherein the packet-switched formatted data realises a transport mechanism through the optical fibre and the packet-switched formatted data is passed to and from the optical communication resource such that packet-switched formatted data is transported, in use, directly between the outstations and the optical line termination equipment;

detecting, at the optical line termination equipment, uplink collisions; and administering media access control of outstations according to the detecting of uplink collision of packet-switched encoded data received in modulated optical carriers.

13. The method of communicating information between outstations and optical line termination equipment via an optical fibre according to claim 12, wherein the packet-switched protocol is Internet Protocol (IP).

14. A computer-readable medium comprising computer-readable instructions for controlling exchange equipment to administer media access control of a plurality of optical outstations coupled to the exchange equipment through an optical fibre, the computer-readable instructions comprising:

code that directs the exchange equipment to receive an optical carrier modulated with a line code supporting packet-switched protocol packaged data;

code that directs the exchange equipment to detect uplink collisions; and code that directs the exchange equipment to administer media access control of the plurality of optical outstations based on detection of uplink collision of packet-switched protocol encoded data received in modulated optical carriers.

15. The computer-readable medium comprising computer-readable instructions of claim 14, wherein the packet-switched protocol is Internet Protocol (IP).

16. The computer-readable medium comprising computer-readable instructions of claim 15, further comprising:

code that directs the exchange equipment to code IP packets into a line code format; and code that directs the exchange equipment to modulate the line code onto an optical carrier, wherein IP encoded data realises transport mechanism through the optical fibre;

code that directs the exchange equipment to pass data in an IP format to and from the optical fibre such that IP encoded data is transported, in use, directly between the exchange equipment and at least one outstation.

* * * * *

UNITED STATES PATENT AND TRADEMARK OFFICE
CERTIFICATE OF CORRECTION

| | |
|---|---|
| PATENT NO. | : 6,870,836 B1 |
| APPLICATION NO. | : 09/540642 |
| DATED | : March 22, 2005 |
| INVENTOR(S) | : Peter Dyke and Michael P. Dyer |

Page 1 of 1

It is certified that error appears in the above-identified patent and that said Letters Patent is hereby corrected as shown below:

Column 11,
Lines 16 and 17, replace:

"1. A communication system comprising optical line termination (OTL) equipment" with --"1. A communication system comprising optical line termination (OLT) equipment"--.

Signed and Sealed this
Second Day of April, 2013

Teresa Stanek Rea
*Acting Director of the United States Patent and Trademark Office*